A. Baker,
Hoof Trimmer.
Nº 29,543. Patented Aug. 7, 1860.
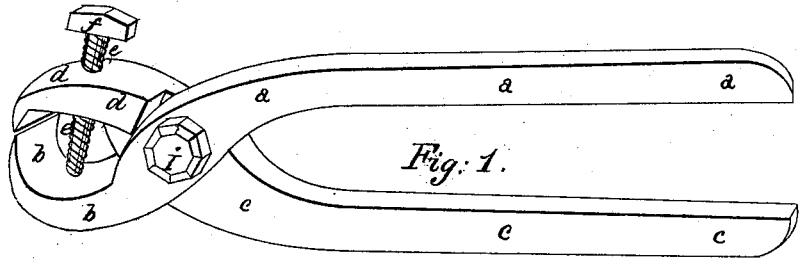
Fig. 1.
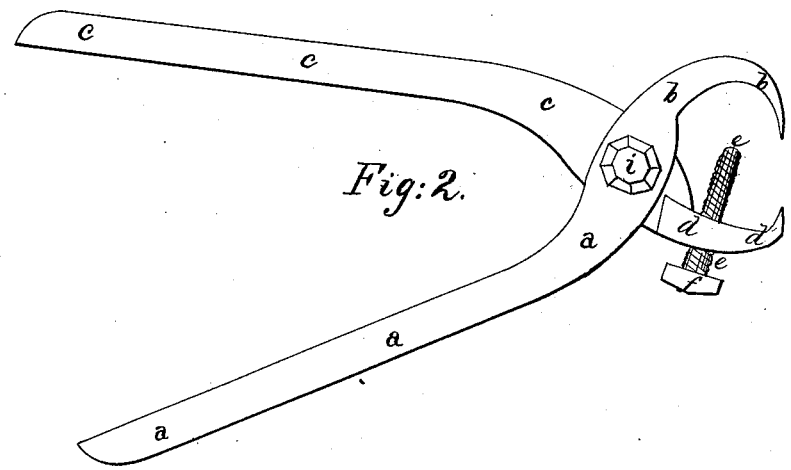
Fig. 2.
Fig. 5.
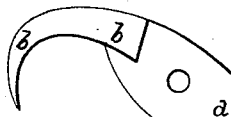
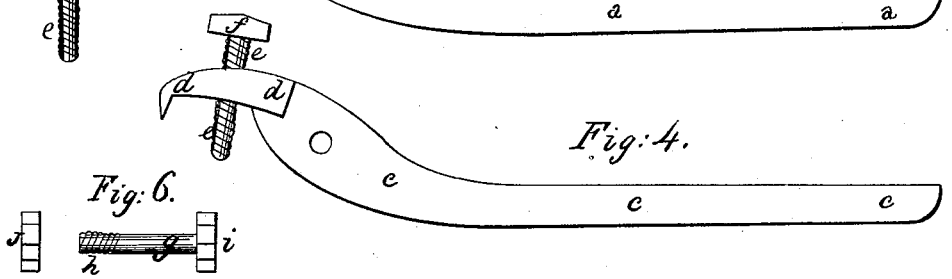
Fig. 3.
Fig. 4.
Fig. 6.
Witnesses.
H. P. Ludwig.
Obed Funk
Inventor
Abraham Baker

UNITED STATES PATENT OFFICE.

ABRAHAM BAKER, OF SHENANDOAH COUNTY, VIRGINIA, ASSIGNOR TO HIMSELF, G. A. BROWN, AND JOHN PIRKEY, OF SAME PLACE.

IMPROVED INSTRUMENT FOR PARING HORSES' HOOFS.

Specification forming part of Letters Patent No. 29,543, dated August 7, 1860.

*To all whom it may concern:*

Be it known that I, ABRAHAM BAKER, a resident of the county of Shenandoah and State of Virginia, have invented and made a new and Improved Instrument for Paring Down or Reducing the Hoofs of Horses and other Animals; and I do hereby declare that the following is a full, clear, and exact description of the same, reference being had to the accompanying drawings, making a part of this specification—

Figure 1 being a perspective view of the instrument, to be of good, suitable metal, Fig. 2 being a side view. Fig. 3 represents the beak-shaped jaw of the instrument. Fig. 4 represents the fulcrum or support-jaw of the instrument. Fig. 5 represents a set-screw or guard-pin. Fig. 6 represents the fulcrum-bolt and end nut thereof.

The nature of my invention consists in the construction of an instrument to be used by farriers or horseshoers to reduce or cut down the hoofs of horses or other animals in a more expeditious manner than can be done by the employment solely of the well-known instrument technically termed the "buttress," my instrument being somewhat in the form of a pair of nippers or cutting-claws, and are applied to the animal's hoof differently from the manner in which the buttress is applied. My instrument, however, is applied to the hoof first, and the buttress used to merely smooth off with afterward. The better, however, to understand the nature, construction, and operration and great utility of my invention, and to enable others to construct and use the same, I will describe it as follows, to wit:

Fig. 1 represents the instrument about one-third the required size, $a\ a\ a$ being a lever-like formation of metal, and $b\ b$ a curved, beak-shaped cutting-jaw.

$c\ c\ c$ represents the lever-handle, other half of the instrument, formed with a more angular-shaped and shorter cutting-jaw, $d\ d$, and has perforated through the center thereof a screw-hole, in which fits an adjusting set-screw or guard-pin, $e\ e$, with an oblong-shaped head, $f$, and as shown detached in Fig. 5.

At Fig. 6 is represented the fulcrum-bolt or rivet-axis, formed with a shank, $g$, and screw-thread $h$, head $i$, and nut $j$, by which bolt or rivet the two lever-jaws $a\ a\ a\ c\ c\ c$ are connected together, as represented in Figs. 1 and 2.

In the use and application of my instrument the farrier holds it in one hand, as would be held or gripped a pair of pinchers, nippers, or tongs, and the hard part of the animal's hoof is detached by placing the beak-shaped jaw $b\ b$ on the inner side or concavity of the hoof, so as to enter the softer part first, and cut outwardly by pressing against or closing the cutting-jaw $a\ a\ b\ b$ against the inner side of the hoof, while the jaw $c\ c\ c\ d\ d\ d$ acts as a supporter-clamp or gripper against the hard or outer convex surface of the hoof, and in this manner of applying the instrument to the hoof the superfluous horny or hard part is chipped off in rather thicker pieces than if the buttress alone were used merely to shave or slice off in thin portions. The instrument can be so used as to take the superfluous part off either in separated or detached cuts, or by a skillful use the part may be cut or taken off in one portion. After the hoof is reduced to the required degree, the buttress is then employed to smooth down or finish off the rim of the hoof, ready for applying the shoe.

The adjusting-screw $e\ e\ f$ is designed to pass entirely through the jaw $d\ d$, and its extremity touching or bearing against the concave or hollow of the cutting-jaw $b\ b$ sufficiently, so as to prevent the cutting-edges of the instrument from striking together and becoming thereby blunt or dull.

The advantages claimed for my instrument and its use are, that much less time is required to reduce or cut down the hoof, enabling the operator to accomplish his work in one-half or more time, and reducing the labor thereupon very materially. The instrument can have its cutting-jaw $b\ b$ rounded at its corners, instead of being acute or square, so as to avoid sticking or cutting into the quick or soft part of the sole of the hoof. My instrument also may be used for the purpose of clipping or nipping wire or small rods, the screw $e\ e\ f$ preventing the cutting-edges striking against each other, and preventing blunting or becoming dull by repeated use.

Having shown and described the nature, construction, and operation of my improved instrument for cutting or reducing the hoofs of animals, what I claim as new, and desire to have secured by Letters Patent of the United States, is—

The construction of the beak-shaped cutting-instrument, arranged with the guard adjusting set-screw, as represented in Figs. 1, 2, 3, 4, substantially as herein set forth and described.

ABRAHAM BAKER. [L. S.]

Witnesses:
OBED FUNK,
H. P. LUDWIG.